US006253438B1

(12) United States Patent
Jespersen

(10) Patent No.: US 6,253,438 B1
(45) Date of Patent: Jul. 3, 2001

(54) METHOD AND APPARATUS FOR BREAKING CONNECTION TIES ON A ROTATABLE LABEL

(75) Inventor: Michael G. Jespersen, Irvine, CA (US)

(73) Assignee: CCL Label, Inc., Sioux Falls, SD (US)

( * ) Notice: Subject to any disclaimer, the term of this patent is extended or adjusted under 35 U.S.C. 154(b) by 0 days.

(21) Appl. No.: 09/401,626

(22) Filed: Sep. 22, 1999

(51) Int. Cl.[7] ..................................................... B23P 19/02

(52) U.S. Cl. ........................ 29/426.4; 29/426.1; 225/102; 198/415

(58) Field of Search .................................. 29/822, 426.4, 29/426.1; 198/415; 225/102, 93

(56) References Cited

U.S. PATENT DOCUMENTS 2,516,998 * 8/1950 Kimball et al. .
4,239,570 * 12/1980 Kerwin .
4,464,884 * 8/1984 Franks .
5,388,707 * 2/1995 Stivison et al. .
5,542,327 * 8/1996 Schultz ............................ 29/426.4 X
5,588,239 12/1996 Anderson .
5,884,421 3/1999 Key .

* cited by examiner

*Primary Examiner*—P. W. Echols
*Assistant Examiner*—Steve Blount
(74) *Attorney, Agent, or Firm*—Warner Norcross & Judd LLP

(57) ABSTRACT

An apparatus and method for breaking connector elements between a rotatable shell and a base of a label affixed to an article. A first belt transports a labeled article at a first rate. A second belt holds the article in a nonrotatable position relative to the first belt. A third belt, advancing at a second rate different from the first rate, selectively contacts the rotatable shell of the label, causing the connection ties between the rotatable portion and the base portion to break, permitting the shell to rotate relative to the base portion.

18 Claims, 2 Drawing Sheets

METHOD AND APPARATUS FOR BREAKING CONNECTION TIES ON A ROTATABLE LABEL

BACKGROUND OF THE INVENTION

The present invention relates to rotatable labels, and more particularly to breaking connective elements, such as adhesive or perforated material, between the rotatable portion of the label and the non-rotatable portion.

Rotatable labels are well known and include an inner layer, or base, adhered directly to a container, and an outer layer, or shell, concentrically and rotatably mounted on the base. During manufacture an application to a container, the shell typically is fixed to the base using connective elements, for example, adhesives or perforations. The consumer or user of the container breaks the connective elements, typically by grasping the shell with respect to the container and the base adhered to the container.

A conventional prior art rotatable label, as disclosed in U.S. Pat. No. 5,884,421, is illustrated in its flat, unapplied state in FIG. 1 and is generally designated 10. The label includes a base 12, which is affixed directly to the container (not shown) and a shell having a rotatable portion 14 and top and bottom guide rails 16, 18. A transparent window 20 permits consumers to view information on base layer 12 through the shell. The shell is temporarily affixed to the base layer 12 along the top and bottom rails 16, 18. Both the base layer and the shell are wrapped around the container. Consumers break the ties 54 manually to allow free the rotatable portion 14 for rotation in the direction designated S.

Rotatable labels present a variety of problems. First, there is no way to assure that the label has been constructed properly. For example, if the base and the shell are unintentionally completely glued to one another, there is no way to test for such a defect. Second, it can be difficult to break the connective elements on large labels used on large containers. Third, elderly and/or weak consumers may have difficulty breaking the perforations or ties utilized with any sized label.

SUMMARY OF THE INVENTION

The aforementioned problems are overcome by the present invention which mechanically breaks the ties or perforations associated with rotatable labels during manufacture. The apparatus and related method of pre-breaking ties during manufacture includes a conveyor for transporting containers having rotatable labels adhered thereto, a holding device for preventing rotation of the containers while on the conveyor, and a contacting device for selectively contacting the rotatable shell of the label to rotate the shell and thereby break the perforations and/or ties.

With this apparatus and method of pre-breaking the ties, the construction of the rotatable label can be properly tested. Additionally, the mechanical pre-breaking of the ties or perforations insures that the weak and/or elderly may use the rotatable label effectively. Finally, the pre-breaking apparatus may be adjustably configured to accommodate a variety of different sized containers and labels; consequently, larger rotatable labels having ties or perforations that are difficult to manually disengage may be mechanically broken for ultimate consumer use.

These and other objects, advantages, and features of the invention will become more readily understood and appreciated by reference to the detailed description of the preferred embodiments and the drawings.

DETAILED DESCRIPTION OF THE PREFERRED EMBODIMENTS

Figure 1:
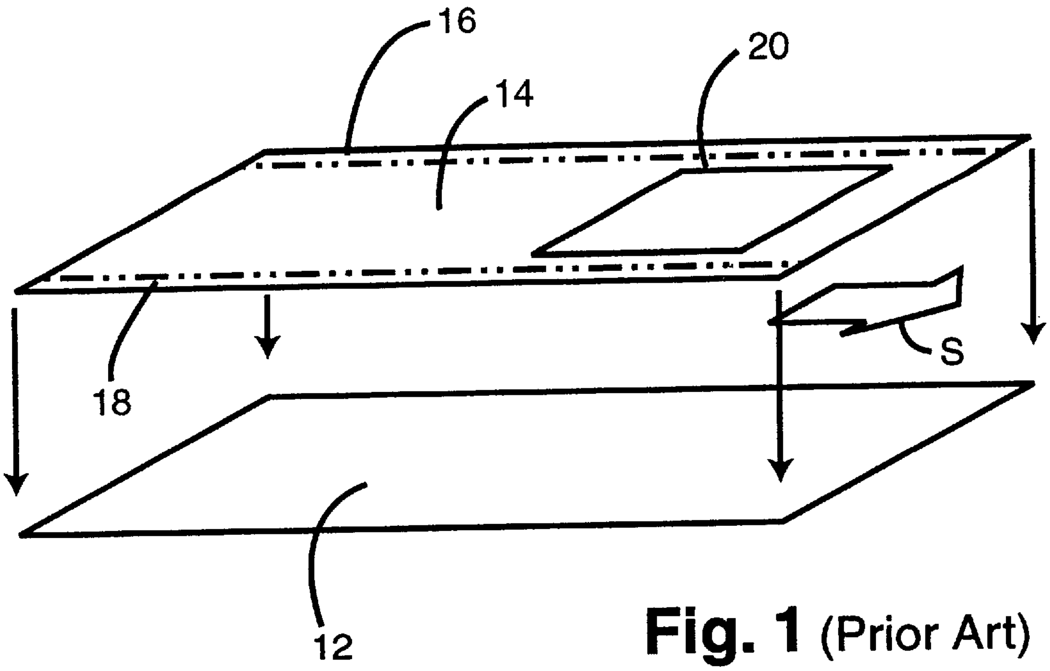
Fig. 1 (Prior Art)
FIG. 1 is a perspective view of an exploded flat rotatable label of the type used in the present invention.
Figure 2:
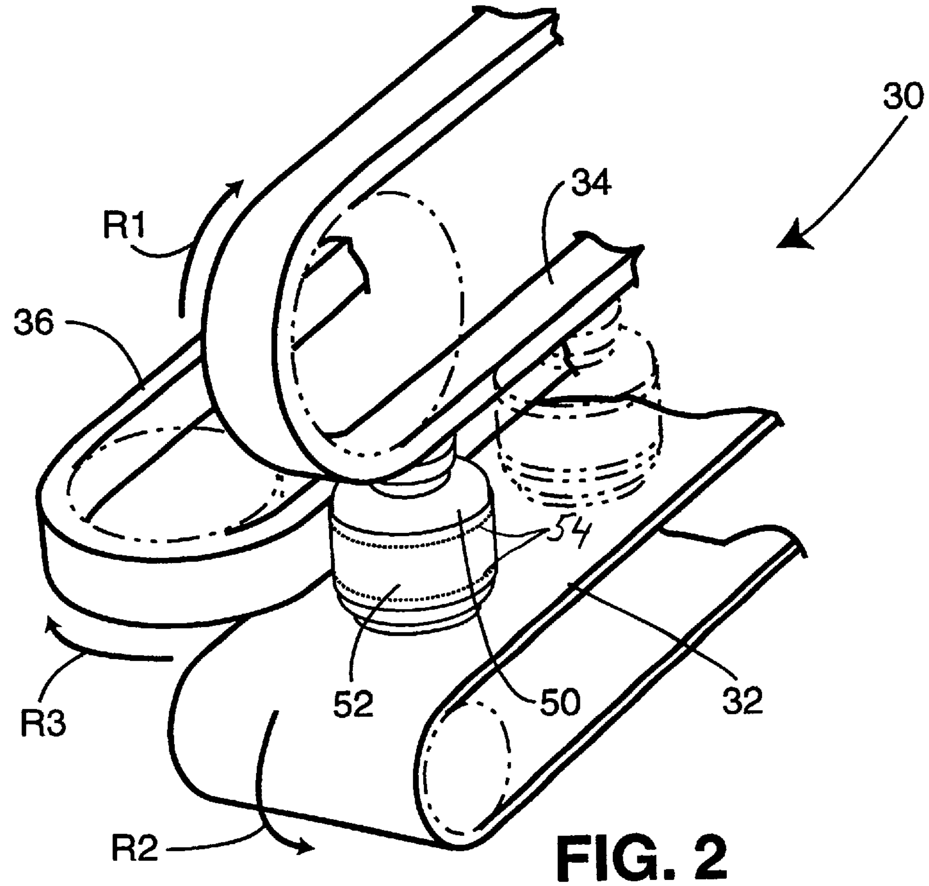
FIG. 2 is a perspective view of apparatus of the present invention.
Figure 3:
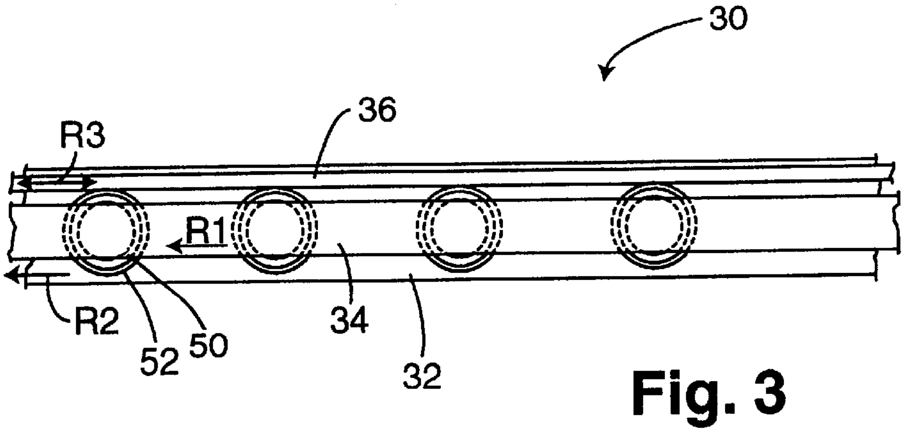
FIG. 3 is a top plan view of the apparatus.
Figure 4:
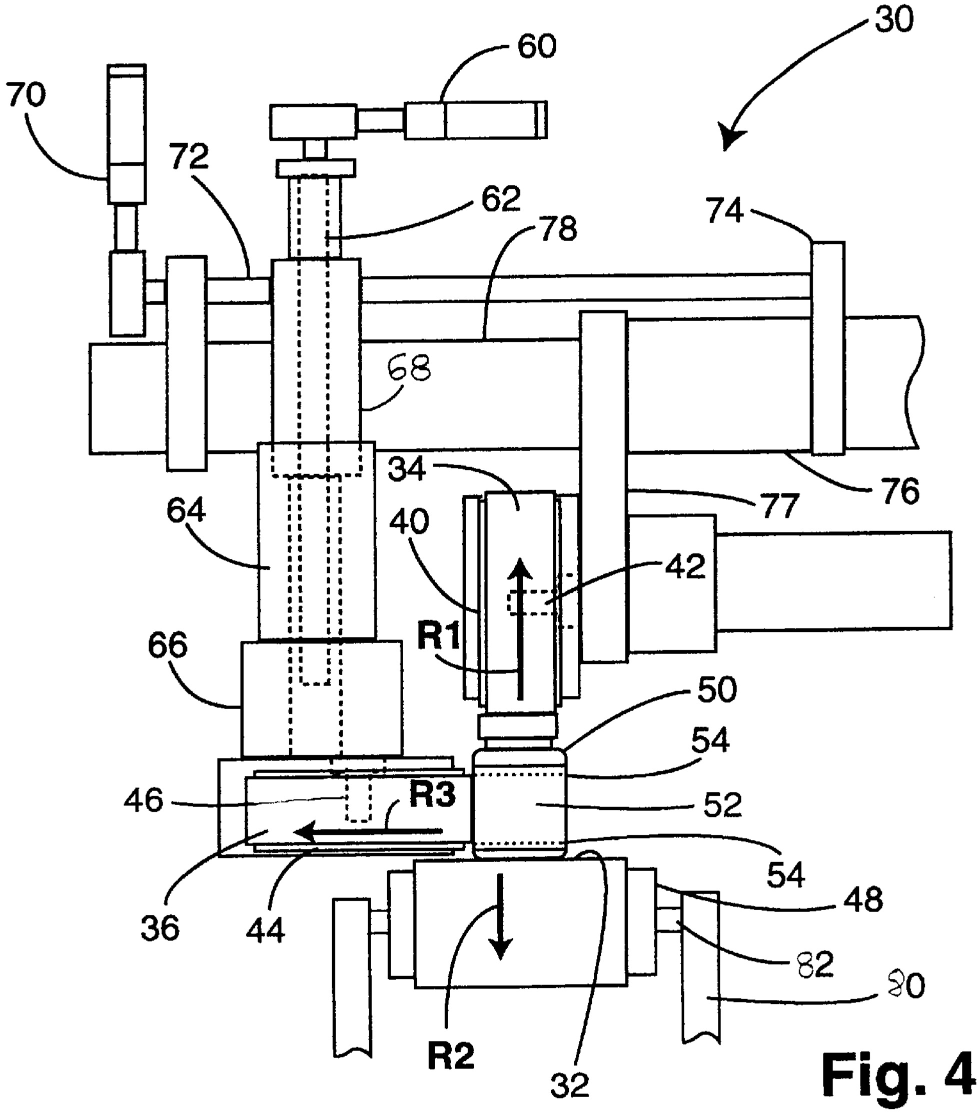
FIG. 4 is a front elevational view of the apparatus.

A tie-breaking apparatus according to a preferred embodiment of the present invention is illustrated in FIGS. 2, 3 and 4, and generally designated 30. As shown in FIGS. 2 and 3, the tie-breaker includes a conveyor belt 32, a holding belt 34, and a contact belt 36. Container 50 is held between the holding belt 34 and the conveyor belt 32 while contact belt 36 comes into contact with the outer most portion of container 50, being the rotatable portion 52, to urge rotation of that portion and cause the ties or perforations 54 to break and allow the rotatable portion to rotate freely.

FIG. 4 illustrates a more detailed schematic of the preferred embodiment, designated 30. Container 50 is conveyed along a conveyor belt 32. Conveyor belt 32 rotates about a set of pulleys, one shown, at 48 and the other not shown. Pulley 48 rotates on shaft 82, which is mounted to support 80. Conveyor belt 32 advances in the direction and rate designated R2 in FIG. 3; accordingly, article 50 also advances forward, that is, out of the drawing, in direction and rate designated R2.

The top portion of the container 50 is compressed by holding belt 34 which advances in direction and rate R1, which for purposes of this embodiment is equal to R2. In this manner, the top and bottom of the container 50 advance at the same rate and permit container 50 to be held in a fixed, stable position relative to conveyor belt 32. Holding belt 34 rotates on a set of pulleys, one shown at 40, and the other pulley not shown. Pulley 40 conventionally rotates on shaft 42. The pulley 40 and pulley shaft 42 are connected to bracket 77 which further is attached to telescoping tubes 76 and 78. Tube 76 may telescope with respect to tube 78 upon rotation of horizontal adjuster handle 70, which consequently rotates horizontal adjuster shaft 72 received in adjuster bracket 74. Accordingly, holding belt 34 may be moved back and forth across the width of the conveyor belt; this range of movement allows a variety of different sized and shaped containers to be accommodated by the device. Similar alternative configurations which allow similar ranges of movement may also be used to implement the invention.

With reference to FIG. 3, contact belt 36 preferably advances in the rate and direction designated R3 in FIG. 3. In alternative embodiments, the contact belt may advance at a rate in a direction 180° opposite R1 or rate R3 may be zero, that is, the contact belt doesn't move. In the preferred embodiment, contact belt 36 is mounted on pulley 44 which rotates on shaft 46. Contact belt 36 also rotates about a drive pulley (not shown) which advances the contact belt at rate and in direction R3. With respect to the rates as depicted in the preferred embodiment of FIG. 3, rate R1 is equal to rate R2, while R3 is greater than rates R1 and consequentially, R2.

The pulley shaft 46 is further mounted to telescoping tubes 66 and 64 in a conventional manner. These tubes act in concert with vertical adjusted handle 60 and vertical adjustment shaft 62, as well as vertical adjustment tube 68.

Upon rotation of vertical adjustment handle 60, vertical adjustment shaft 62 rotates. Because the vertical adjustment shaft 62 is threaded, as are telescoping tubes 66 and 64, contact pulley 44 and all connected apparatus may be vertically adjusted up and down relative to conveyor belt 32 to accommodate a variety of different sized and shaped containers. The conveyor belt 32, the holding belt 34, and the contact belt 36 may be made of any material including nylon reinforced rubber, plastic, or any suitable flexible synthetic material. It is, however, preferred for the belts to be made of a semi-tacky substance to assure adequate gripping of the container and the rotatable portion of the label by the belts. Additionally, contact pulley 44 and contact belt 36 may be altered or replaced by different sized pulleys and contact belts to accommodate a variety of different sized rotatable layers 52 on containers 50.

Operation

As shown collectively in FIGS. 2, 3 and 4, the conveyor belt 32 advances the containers having rotatable labels attached thereto in direction and rate as indicated as R2. Holding belt 31 is positioned by an operator using the horizontal and vertical adjusting 60 and 70 so that it tightly presses against the uppermost portion of the container 50, and accordingly compresses the container against conveyor belt 32 so that rotational or any other translational movement of the container 50 is inhibited, but at the same time preventing conveyor belt 32 from being bound against the pulley 48.

Holding belt 34 advances at the same rate and direction as conveyor belt 32, that is, R1 is equal to rate R2 as depicted. With the containers 50 being advanced on the conveyor belt 32, the contact belt 36 is aligned between perforations 54 on the rotatable label so that its contact surface only selectively engages the rotatable portion of the label 52. Contact belt 36 rotates in direction R3, the same as the direction R1 and R2, however, rate R3 is greater than rate R1 and R2. Accordingly, when contact surface of the contact pulley 36 is brought into contact with the rotatable label portion 52, that rotatable portion 52 is rotated with respect to the container 50, thus causing perforations or ties 54 to be broken and the rotatable portion to rotate relative to the container 50.

After the perforations 54 have been broken, the container advances to the next applicable step in the process of manufacture, after being ejected, removed or dropping off conveyor belt 32 and disengaged from contact belt 36 and holding belt 34.

The above description is that of a preferred embodiment of the invention. Various alternations or changes can be made without departing from the spirit and broader aspects of the invention as defined in the appended claims. Any reference to claim elements in the singular, for example using the articles "a", "and" or "said" is not to be construed as limiting the element to only one element unless so specifically stated. The claims are to be interpreted in accordance with the principles and patent law including the doctrine of equivalence.

The embodiments of the invention in which an exclusive privilege or property is claimed are defined as follows:

1. An apparatus for rotating a first label layer relative to a second label layer positioned on an article, comprising:

conveyor for moving the article;

a first belt parallel to said conveyor for holding the article in fixed position relative to said conveyor to prevent rotation of the article; and a second belt parallel to said conveyor for selectively engaging the first label layer and moving the first layer relative to the second layer.

2. The apparatus of claim 1, wherein said conveyor advances linearly at a first rate and said first belt advances linearly at a second rate equal to said first rate.

3. The apparatus of claim 2, wherein said second belt advances linearly at a third rate being greater than said first rate.

4. The apparatus of claim 3, wherein said second belt is capable of selectively engaging the article by contacting a portion of the first label layer.

5. The apparatus of claim 4, wherein the first label layer is rotatable relative to the second label layer which is affixed to the article when said second belt selectively engages the article.

6. The apparatus of claim 5, wherein the first belt is adjustable with respect to said conveyor whereby different sized articles may be held in a fixed position relative to said conveyor.

7. The apparatus of claim 6, wherein said second belt is selectively configurable in a plurality of orientations with respect to said conveyor whereby different sized and shaped articles may be selectively engaged by said second belt.

8. An apparatus for breaking connection ties between a rotatable shell and a base, the base being affixed to a container, comprising:

means for conveying the container;

means for holding the article in a fixed, non-rotating position relative to the conveyor; and means for selectively engaging the rotatable shell and breaking the ties between the rotatable shell and the base.

9. The apparatus of claim 8, wherein said conveying means and said holding means advance parallel to one another.

10. The apparatus of claim 9, wherein said breaking means further includes a contact surface width which is less than the width of the rotatable shell.

11. The apparatus of claim 10, wherein said breaking means is adjustable to a plurality of orientations to accommodate a variety of container sizes and container shapes.

12. An apparatus for rotating a first layer relative to a second layer on a label with the label affixed to a container, comprising:

a conveyor for transporting the container;

a holding belt positioned above said conveyor, said holding belt preventing translational and rotational movement of the container relative to said conveyor; and an engagement belt proximal to said conveyor and capable of contacting the first layer of the label whereby the first layer of the label is rotated relative to the second layer of the label.

13. A method for breaking connection ties between a rotatable shell and a base where the base is affixed to an article comprising the steps of:

providing an article including a label with a rotatable shell releasably attached to a base;

holding the article in a fixed, non-rotating position between a first belt and a second belt that advance at an equal rate; and rotating the rotatable shell relative to the base with a third belt advancing at a second rate that contacts the rotatable shell whereby the connection ties are broken.

14. The method of claim 13, wherein said holding step is accomplished by the second belt compressing the article against the first belt.

15. The method of claim 14, wherein said third belt moves linearly and parallel to the first belt whereby contacting the rotatable shell with the third belt causes the rotatable shell to rotate relative to the base.

16. The method of claim 15, wherein the first belt and second belt are adjustable to accommodate a variety of different sized articles.

17. The method of claim 16 further comprising the step of transferring the article from the first belt and second belt to a fourth belt.

18. The method of claim 16 further comprising the step of removing the article from the first belt and second belt.

* * * * *